United States Patent [19]

de Cortanze

[11] Patent Number: 4,890,857
[45] Date of Patent: Jan. 2, 1990

[54] STEERABLE WHEELS OF LAND VEHICLES

[75] Inventor: Andre de Cortanze, St. Cloud, France

[73] Assignee: Elf France, Courbevoie, France

[21] Appl. No.: 142,536

[22] Filed: Jan. 11, 1988

[30] Foreign Application Priority Data

Jan. 12, 1987 [FR] France ................ 87 00207

[51] Int. Cl.⁴ .............................................. B62K 21/02
[52] U.S. Cl. ...................................... 280/663; 280/691;
280/277
[58] Field of Search .............. 280/663, 664, 666, 667,
280/691, 695, 696, 275, 276, 277

[56] References Cited

U.S. PATENT DOCUMENTS

| 2,054,288 | 9/1936 | Hostie | 280/663 |
| 2,062,233 | 11/1936 | Poirier | 280/699 |
| 3,074,737 | 1/1963 | Peras | 280/666 |
| 4,265,329 | 5/1981 | de Cortanze | 280/275 |

FOREIGN PATENT DOCUMENTS

| 643807 | 4/1937 | Fed. Rep. of Germany | 280/696 |
| 151699 | 9/1920 | United Kingdom | 280/696 |
| 542071 | 12/1941 | United Kingdom | 280/666 |

Primary Examiner—Kenneth R. Rice
Attorney, Agent, or Firm—Burgess, Ryan & Wayne

[57] ABSTRACT

The device for the suspension and steering of a vehicle wheel of the type having two arms pivoted, on the one hand, at the stub axle bracket that they support, and on the other hand, at the vehicle body around axes substantially orthogonal to the axial longitudinal plane of symmetry of the vehicle, the stub axle bracket has the general shape of a tetrahedron A'B'C'D', one of the apex D' being a point of the stub axle axis D'D", two apex A'B' defining the steering axis being the centers of pivoting joints with each of the arms AA' and BB' and the fourth apex C' being the center of a pivoting joint with the steering control kinematic train, and applying to improvements to front wheel of land vehicles.

8 Claims, 2 Drawing Sheets

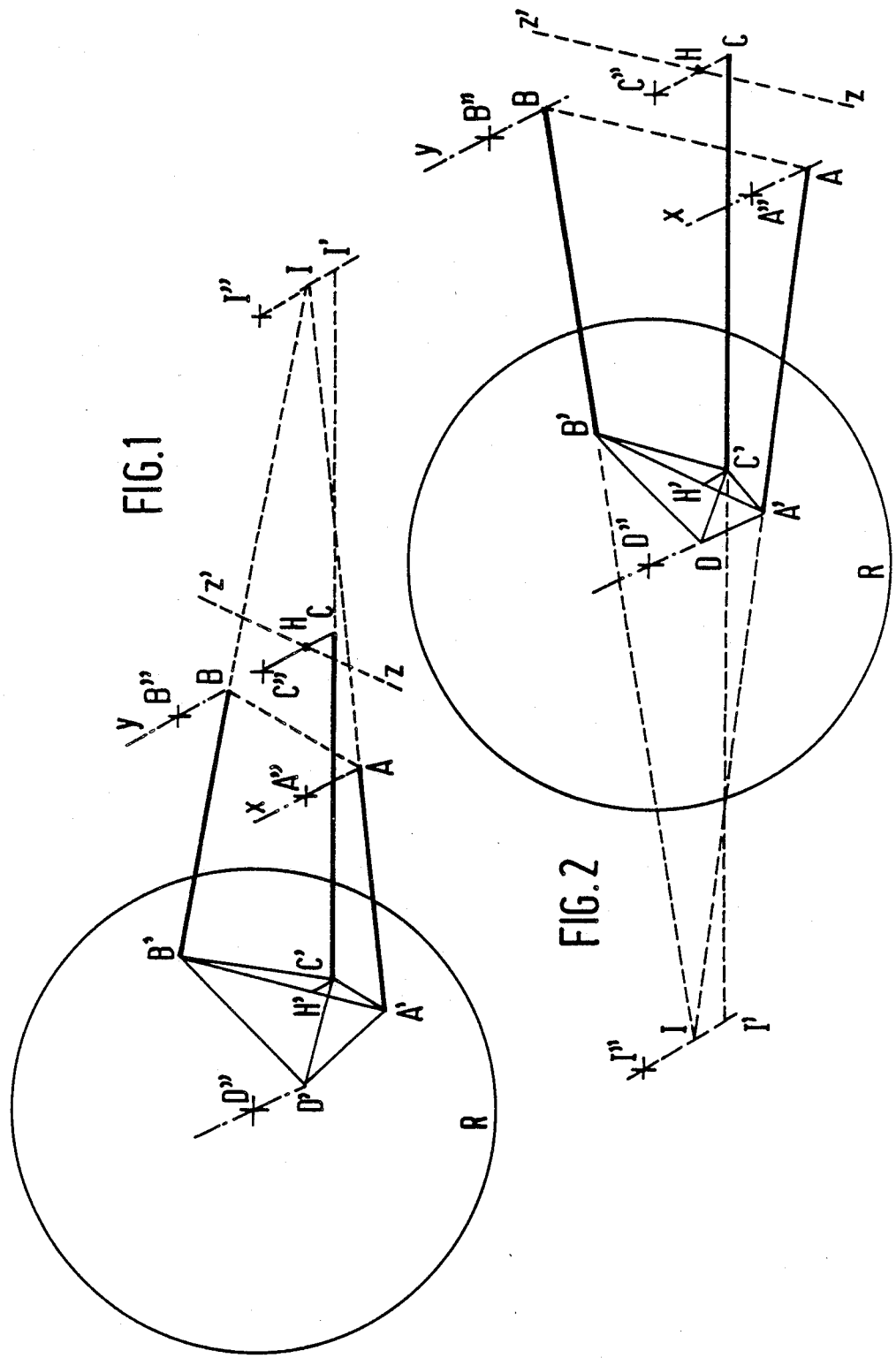

STEERABLE WHEELS OF LAND VEHICLES

BACKGROUND OF THE INVENTION

1. Field of the Invention

The present invention concerns improvement to steerable wheels of land vehicles the suspension of which is ensured through two lateral arms located on a single side of the wheel.

Such devices are known in the prior art and in particular in French Patent published under No. 2 418 141. According to this patent, the front suspension has the general form of a quadrilateral of which the apices are the ends of two arms, pivoted on one of their ends on an element integral with the body of the vehicle and at the other end on a stub axle bracket triangle of the front wheel.

The axle corresponding to the side of the said stub axle or swivel pin triangle associating the ends of the arms allows to turn the front wheel. It is materialized by two hinging and pivoting devices with the ends of the arms, of the ball and socket type or equivalent. The two arms are mounted in rotation on the vehicle body due to two substantially horizontal axles (in normal positioning of the vehicle) and they are situated substantially in a single vertical plane thus containing the centres of the ball and socket joints and the turning steering axis passing through these centers.

The shock absorbing and suspension system per se is essentially constituted by a spring shock absorber assembly generally disposed between an arm and an element integral with the vehicle body. When the suspension is actuated, the arms pivot in the said vertical plane, provoking the displacement in this single plane of the swivel type joints and thus the turning steering axis.

With respect to the steering system itself, it is constituted by a side lever integral with the triangle moved by a transmission transmitting to the said lever the movements of the handlebar or other steering control device.

However, the major difficulty encountered in producing this steering assembly is to allow the suspension to function without introducing any stray variation of the steering angle defined itself by the handlebar or equivalent.

In fact, if for example the handlebar imposes upon the vehicle straight driving, when the suspension functions, the end of the lever integral with the triangle must follow a curve in a plane parallel to the vertical plane of the arms. If the kinematic steering control transmission is not adapted to allow the end of the lever to follow this curve, the foreseen steering angle is not respected and, for example, oscillations of the suspension can provoke oscillations of the steering angle with the consequences that this involves on the driving of the vehicle.

The problem has been solved in the case of parallel arms of the same length and thus of the parallelogram quadrilateral since the movement of any point associated to the stub axle bracket is thus a pure rotation of which the radius is equal to the length of the arms.

In this case, it is sufficient that the kinematic transmission presents a bar the length of which is that of the arms, which is pivotally connected to the said lever at one end and the other end of which pivots around a point located adjacent to the opposite side of the parallelogram. Preferably, this bar is displaced substantially parallel to the vertical plane of the arms when for a given steering angle the suspension functions.

But, in the case of non parallel arms and/or arms of different lengths, the solutions are difficult to find and only remain approximate once each point associated to the triangle follows a complex curve.

The object of the present invention is to provide a solution as precise as possible to this problem while allowing the suspension to perform its function whatever the turning or steering angle defined by the handlebar or equivalent, and without bringing to the steering angle any stray variation.

In the description given herein-above, reference will be made to motorcycles that represent a typical application example of suspensions having two lateral arms, it being well understood that it concerns a non-limitative example and that the invention can apply to all vehicles presenting at least one front wheel mounted on two arms adapted to pivot and/or oscillate around substantially horizontal axes (in the normal position of the vehicle). In the case of the motorcycle, and in particular of the motorcycle with two wheels, will be called the axial plane of symmetry, the longitudinal plane with respect to which most of the constitutive elements are symmetrical and especially, body, saddle, rear wheel, and, when the steering angle is nil, front wheel and handlebar.

When the motorcycle is riding straight, this plane is substantially vertical and the wheel axles are substantially horizontal. In the following description, and in order to simplify the wording, the references to the verticality and the horizontality will correspond in the case of the vertical symmetry plane, it being well understood that in the case of cornering or banking the assembly inclines normally from the side of the center of the curve followed.

Furthermore, when the suspension is fixed in a given position, it is necessary that the steering control be transmitted from the handlebar or equivalent to the stub axle; the linearity of the transmission of the steering angle being necessary so that the driver can regularly adjust the steering angle. If this condition is satisfied, as well as the preceding one on the keeping of a given steering angle when the suspension functions, it is thus possible to cause to act without disturbances simultaneously the steering control and the suspension.

SUMMARY OF THE INVENTION

While the techniques according to the prior art have never offered any satisfactory practical solution to the whole of these problems, the present invention proposes an embodiment that is simple and accurate when operating.

It utilizes essentially a piece having a generally tetrahedric or approximately tetrahedric general shape, the tetrahedron being materialized by three universal joints of the swivel or equivalent type, which are centered on three apices of the tetrahedron, the fourth apex being a point of the axis of the stub axle of the driving wheel. Two first universal joints, for example, of the swivel or equivalent type are each pivoted to one end of one of the arms of the suspension and thus materialize the steering axis passing through their centers, the third being pivoted to an element of the kinematic train or transmission for controlling the steering and thus the steering angle.

The axis of the stub axle passing through the fourth apex is preferably substantially parallel to the side of the tetrahedron defined by the three swivel joints and containing the steering axis. Consequently, the side corresponding to this plane containing the three swivel joints and passing through the steering axis is substantially orthogonal to the axial longitudinal plane corresponding to a zero steering angle.

Furthermore, the kinematic train element hinged to the third swivel joint preferably presents the forms of a link the other end of which is preferably also hinged by a universal joint, for example, swivel type or equivalent, to an element turning around an axis and controlled by the steering control device such as a handlebar or equivalent. The said link is preferably parallel to the plane passing through the steering axis and orthogonal to the horizontal pivoting axes of the arms which will be referred to as plane of the suspension arms which, as is already known, turn in this substantially common and vertical plane each around its substantially horizontal axis. According to one preferred embodiment of the invention, the axis of rotation of the control element, such as a crank, is substantially parallel to this plane.

BRIEF DESCRIPTION OF THE DRAWINGS

To render more apparent the technical characteristics and the advantages of the present invention, the following embodiments will be described it being well understood that they are in no way limitative of the invention as to their carrying out and the applications that can be made thereof.

Reference will be made to the following figures which schematically represent in approximated perspective:

FIGS. 1 and 2 the geometry of two embodiments of steering and suspension systems having two arms, for a vehicle wheel;

FIG. 1 represents schematically the geometry of an embodiment according to the invention. Two axes Ax and By are substantially horizontal and orthogonal to the longitudinal axial vertical plane of the vehicle in A" and B". These axes correspond to axes integral with the motorcycle body as will be seen herein-below. Around these axes can pivot the straight segments AA', BB' corresponding to arms, these two segments AA' BB' being placed and preferably turning in a single plane called "of the arms", parallel and vertical to the longitudinal axial plane. The ends A' and B' of these segments AA' and BB' define an axis moving in a vertical plane when AA', BB' pivot; this plane is the same as that one of the segments AA' BB'; the axis A'B' is the steering axis; it is associated to the axis D'D" of the wheel R, D'D" and A'B' being segments of orthogonal but not converging straight lines, D'D" is thus substantially horizontal and perpendicular to the vertical planes and especially to the axial longitudinal plane in D" centre of the wheel R.

A", B" and D" are thus coplanar in the axial longitudinal plane. FIG. 1 corresponds, as mentioned herein-above, to the axial position of the wheel R, i.e. to a zero steering angle.

Figure 3:
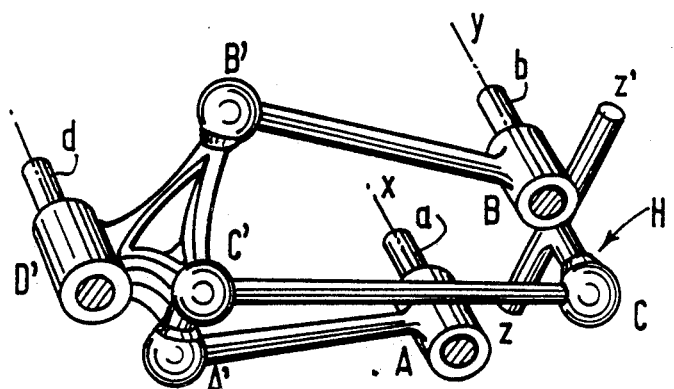
FIGS. 3 and 4 the mechanical elements corresponding to the geometry of FIG. 1 according to two alternatives.

The point D is the intersection point of the wheel axle D'D" with the plane passing through A'B' perpendicular to D'D". This plane coincides with the vertical plane of AA'BB' for a zero steering angle, i.e. with the plane of the arms. It can normally pivot around the steering axis A'B' driving in its rotation the triangle A'B'D' and the axis D'D". A point C' outside this plane defines with the triangle A'B'D' a tetrahedron A'B'C'D' adapted to pivot around the steering axis A'B'.

The axis A'B can, as will be seen herein-below, be realized in the form of two universal joints such as swivel joints, cardan joints or equivalent centered on A' and B'. When AA' and BB' pivot around the axes AA" and BB", A'B' moves in its vertical plane or arms plane and drives C', D' and DD" in a displacement in the respective vertical planes which are parallel to this axial longitudinal plane (or coinciding with this latter with respect to D").

A point C is adapted to turn around an axis zz' and in particular around its orthogonal projection H on zz'. This axis is preferably located in a vertical plane parallel to the axial longitudinal plane. The point C defines with the apex C' at the tetrahedron A'B'C'D' a straight line segment CC' which, as will be seen herein-below, can be characterized by a link or an arm CC' articulated by universal joints or equivalent such as cited for A'B', on the one hand of the tetrahedron A'B'C'D', on the other hand at the segment CH itself realized by a crank turning around zz'. The rotation of HC around zz', provokes the movement of C', of D' and of D" around A'B'.

As described in the prior art, the simultaneous pivoting of AA', BB' around their respective axes AA" and BB" provokes the displacement of A'B'C'D' and when the various elements are in the position of FIG. 1, the instantaneous center of rotation of A'B'C'D' is the point I of convergence of the straight lines bearing the segments AA' and BB'. At FIG. 1, this point I is on the side opposite the wheel R with respect to AB.

FIG. 2 is identical to FIG. 1 with the exception of the fact that the point I is on the same side as the wheel R with respect to AB.

The arrangements of FIGS. 1 and 2 depend in fact upon the dimensions of the sides of the deformable quadrilateral AA'BB'. In particular, if the segment AB is shorter than the segment A'B', the straight lines bearing the segments AA' and BB' generally converge on the side AB (FIG. 1); if on the contrary, the segment A'B' is smaller than the segment AB, the convergence is generally inverted (FIG. 2). Here the expression "generally" is used since during the deformations of the quadrilateral AA'BB' it happens that the convergence of the opposing segments changes direction.

In the two cases of FIGS. 1 and 2, the instantaneous movement of A'B'C'D'D" is centered on the axis II" substantially horizontal and perpendicular in I" to the axial longitudinal plane containing A"B" and, in position of zero steering, D". The tangents to the respective paths of A', B', C' and D' are respectively orthogonal to A'I, B'I, C'I, and D'I; if I' is the orthogonal projection of C' on II", the path of C' is centered on I'.

If the point C is such that C'C and I' are aligned, an instantaneous rotation of C' around C or around I' would have the same tangent. This means that even if C is fixed at a given instant, once C'CI'I" are coplanar, the instantaneous movement of A'B'D' around I is not incompatible with that of C' around C.

This observation is important since if the steering angle of the tetrahedron A'B'C'D' and of the wheel R around the steering axis A'B' is imposed by the position of C associated to C', if the arms-segments AA', BB' pivot in their vertical plane, C' will follow without provoking, due to the fixed length of the segment CC', a steering angle variation. Therefore, if C is maintained in the plane C'II'I", any stray variation of the steering angle is eliminated.

Furthermore, the rotation movement of C' around the axis A'B' provokes the turning of the wheel R. For mechanical reasons, when the wheel turns on the side opposite the bar CC', i.e. when C' turns while shifting away from I, it is preferable that C' does not encroach upon the plane ABA'B', i.e. that C must always remain on the same side. The same is true when the wheel R turns towards the side of CC'. According to a preferred embodiment of the invention, the projection H of C' on the plane A'B'D' of the bar of the tetrahedron A'B'C'D' must be located on the axis A'B'. The diedron defined by the two faces A'B'D' and A'B'C' of the tetrahedron is thus preferably rectangular, D' being the point of the axis A'B'; the triangle A'B'C' and the straight line segment C'H' height of the triangle are thus parallel to the axis of the wheel R.

The transmission of the steering movement from the handlebar or equivalent up to the pivoting point C' must be symmetrical, i.e. for symmetrical steering angles, the rotation angles of the handlebar must be symmetrical and thus equal although in opposite directions. The transmission with three bars constituted by HC (H being the orthogonal projection of C on its axis of rotation zz'), CH and C'H' must therefore be as symmetrical as possible. This is obtained in particular if CC'H'H practically forms a parallelogram. This supposes that preferably zz' remains parallel to A'B'. Then if ABB'A' is not a parallelogram, A'B' does not remain parallel to itself during functioning of the suspension. It is thus preferable according to one preferred embodiment of the invention, that zz' be parallel to A'B' in average position, i.e. with half load of the vehicle. Similarly, according to one preferred embodiment of the invention, the bars H'C' are H'C are substantially parallel and preferably substantially equal.

It has been noted herein-above that the instantaneous center of rotation I displaces when the suspension functions. It is thus preferable according to one preferred embodiment of the invention that the bar CC' pass through the center of curvature of the curve followed by I, this center of curvature corresponding to the position of I in the position of ABB'A' itself corresponding to an average load of the vehicle.

With reference to FIG. 3 schematically representing in perspective a mechanical embodiment of the principal elements of FIG. 1 the same references designate the corresponding elements.

The arms or bars AA' and BB' can pivot by any adequate means on the axes a and b associated to the body of the vehicle not represented (axes Ax and By of FIG. 1). These axes are substantially perpendicular to the axial longitudinal plane of the vehicle and the bars AA' and BB' pivot parallel to this same plane.

The ends A' and B' carry through the intermediary of universal joints, for example the swivel articulations, the piece having a general shape of a tetrahedron A'B'C'D', the axis of the joints A'B' constituting the steering axis.

In D' is mounted the stub axle d of the not represented wheel (corresponding to D'D" on FIG. 1), the axis of the wheel d and the steering axis A'B' being substantially orthogonal although not converging. A third universal joint such as a swivel articulation C' is mounted at the fourth apex of the tetrahedron, the centers A', B', C' of the swivel joints forming one side of the said tetrahedron substantially parallel to the axis of the wheel.

The pivoting point C' receives one end of a link CC' the other end of which is pivoted by a universal joint such as a swivel joint on a crank CH integral with an axis zz' rotatively pivoted by the handlebar or an equivalent steering device; the axis zz' is preferably parallel to the steering axis A'B' when the vehicle is at half load.

Furthermore, the crank CH is preferably parallel to the plane A'B'C' and thus to the stub axle of at least a wheel for a zero steering angle. According to another feature of the invention, it is possible to provide this crank CH with a length (taken between the axis zz' and the center C of the ball and socket joint) equal to the distance from the center C' of the swivel joint C' to the steering axis A'B'. When the vehicle has only half load, the bars AA' and BB' and the link CC' pass substantially through a common axis II'I (FIG. 1 not represented FIG. 3) perpendicular to the axial longitudinal plane.

In fact, to allow a large turning of the wheel R, it is necessary that the arms AA' BB' be placed at a distance of one another and exhibit a general U-shape in order to leave enough place for the tread tire assembly.

Figure 4:
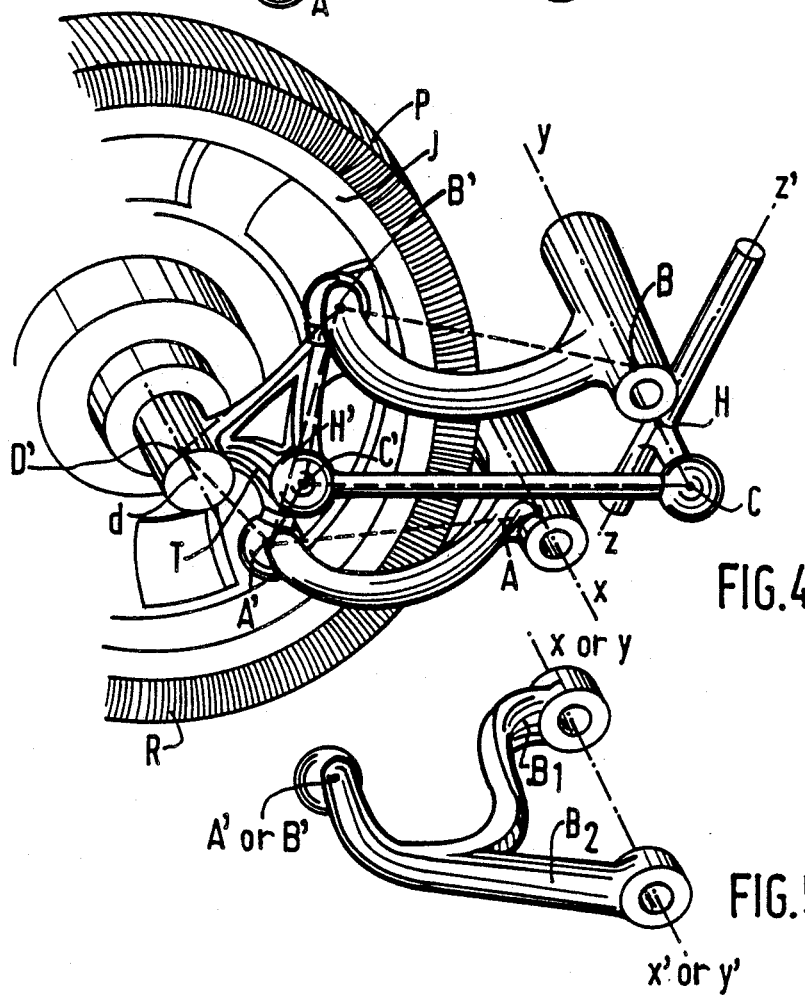

FIG. 4 represents very schematically one embodiment; on this figure are shown the elements of the preceding figures under the same references.

The centers A'B'C' of the universal joints, for example of swivel type such as represented in FIG. 4, are again shown with their geometric definition. A' and B' define the steering axis parallel to the axial longitudinal plane of the vehicle. A'B' and C' define one of the sides of the tetrahedron.

The rotation axes x and y of the arms are well defined, preferably perpendicular to the axial longitudinal plane. The points A and B are the orthogonal projections of A' and B' on the respective axes x and y.

ABA'B' are thus in a single plane called "arms plane" although the arms are not rectilinear, this plane being parallel to the axial longitudinal axis. The axis d of the wheel R is also well defined since it corresponds to the stud axle integral with the tetrahedric piece T. Preferably, this axis d is parallel to the side A'B'C'.

The apex D' of the tetrahedron is at the intersection of the axis d and of the plane orthogonal to d, brought by the steering axis A'B'.

The arms AA', BB' are provided with a generally U-shaped form in order to allow the turning of the wheel without contact with the tire P and the tread J.

In this description, the portion of each arm located on the side A or B is represented being able to be mounted on an axis of the body of the vehicle (not represented) maintained at the two ends. It is possible to envisage as an alternative other solutions such as (FIG. 5) arms in h that will present one part in a U-shape such as on FIG. 4 and on the side A or B two small arms $B_1$ and $B_2$ (the feet of the h) coming on either side of the vehicle, for being mounted on the respective axes x, y integral through the middle of the vehicle body.

The point C is the center of the universal joint, for example the swivel joint of FIG. 4. The link CC', ensuring the turning of the wheel can generally be rectilinear since it is laterally shifted. Furthermore, it works upon traction or compression according to the direction of the turning and the straight form is preferable, especially upon compression.

The axis zz' is well defined and the point H can be the orthogonal projection of C on zz', HC forming a crank integral with the axis zz'. This axis preferably parallel to the axial longitudinal plane is kinematically connected by any suitable means (not represented) to the handlebar or any other steering control device.

When the steering angle is nil, and the vehicle thus can be driven in a straight line, the stub axle d and the side A'B'C' of the tetrahedron are perpendicular to the axial longitudinal plane and the crank HC is also preferably perpendicular to said plane. Furthermore, the distance C'H' from C' to A'B' is preferably equal to that CH of C to zz'.

For the mean load zz' is preferably parallel to A'B' and CC' passes through the perpendicular II'I'' (FIGS. 1 and 2) to the axial longitudinal plane passing through I crossing point of AA' and BB' and instantaneous center of rotation of the tetrahedron T when the suspension functions, i.e. when the quadrilateral AA'B'B is deformed; CC' is, according to one preferred embodiment of the invention, situated in the same plane parallel to the axial longitudinal plane.

The parts of the suspension and shock absorbing devices generally constituted by one or several helical springs cooperating with one or several shock absorbers have been omitted from FIGS. 3 and 4.

According to one embodiment known in the prior art, a coaxial spring and a shock absorber are mounted between one of the arms AA', BB' and a point of the body of the vehicle.

It will also be noted that especially in the case where the lengths of arms AA' and BB' are only slightly different, for a very small stroke of the suspension A' and B' follow circles centered respectively on A and B, C' follows a curve only slightly different from a circle centered adjacent to AB even on AB (in projection on the axial longitudinal plane).

Figure 5:
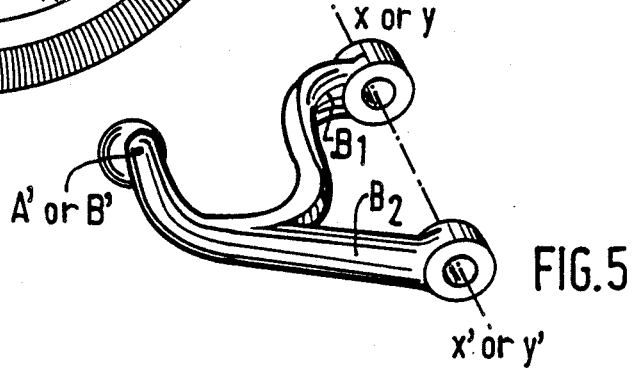
FIG. 5 represents an alternative of the arm shape.

The solution of FIG. 5 can allow to mount C on the crank CH of an axis zz' passing substantially between the arms $B_1 B_2$ of each suspension arm, thereby allowing to place C at the center of curvature.

It is well understood that the examples and alternatives given in the foregoing description are adaptable to numerous variants available to those skilled in the art without in no way departing from the scope and spirit of the invention.

I claim:

1. A suspension and steering device for a steerable wheel mounted on a stub axle of a motorcycle, the stub axle having an axis, the motorcycle having a body, an axial longitudinal plane of symmetry, a steering axis and a steering control kinematic chain, said device comprising a stub axle bracket pivotally mounted on said stub axle, said stub axle bracket having the general shape of a tetrahedron with first through fourth apices, said first apex being positioned on the axis of said stub axle, said second and third apices defining the steering axis and said fourth apex being at the center of a pivoting joint connection with the steering control kinematic train, and two arms, each arm being pivoted by a pivoting joint at one end thereof to the stub axle bracket at a respective one of said second and third apices so as to support said stub axle bracket and pivoted at an opposite end thereof to the motorcycle body about an axis of the motorcycle body substantially orthogonal to the axial longitudinal plane of symmetry, such that pivotal centers of said opposite ends of said two arms are located at an orthogonal projection of said second and third apices with the tetrahedron, said arms each being linearly configured and defining a plane parallel to the axial longitudinal plane of symmetry of the motorcycle which contains the steering axis, wherein imaginary extensions of said arms intersect at a point which is the instantaneous center of rotation of said tetrahedron and of the stub axle with respect to the motorcycle body at any instant of time, with an imaginary axis passing through said instantaneous center of rotation and being orthogonal to the axial longitudinal plane of symmetry of the motorcycle, said motorcycle further including a crank driven by the steering control kinematic train about a crank axis and a link pivotally connected between said crank and the pivoting joint at the fourth apex of the tetrahedron, said link having a longitudinal axis passing through a point substantially located on said imaginary axis at the instantaneous center of rotation.

2. A device according to claim 1; wherein each arm is swivel mounted at said one end thereof to the stub axle bracket at the respective one of said second and third apices.

3. A device according to claim 1; wherein said second through fourth apices are situated in a plane parallel to the axis of said stub axle.

4. A device according to claim 1; wherein the axis of rotation of the crank is parallel to the steering axis at half load of the motorcycle.

5. A device according to claim 1; wherein the length of said crank is substantially equal to the distance from the fourth apex of the tetrahedron to the steering axis.

6. A suspension and steering device for a steerable wheel mounted on a stub axle of a motorcycle, the stub axle having an axis, the motorcycle having a body, an axial longitudinal plane of symmetry, a steering axis and a steering control kinematic chain, said device comprising a stub axle bracket pivotally mounted on said stub axle, said stub axle bracket having the general shape of a tetrahedron with first through fourth apices, said first apex being positioned on the axis of said stub axle, said second and third apices defining the steering axis and said fourth apex being at the center of a pivoting joint connected with the steering control kinematic train, said second through fourth apices being situated in a plane parallel to the axis of said stub axle, and two arms, each arm being swivel mounted at one end thereof to the stub axle bracket at a respective one of said second and third apices so as to support said stub axle bracket and pivoted at an opposite end thereof to the motorcycle body about an axis of the motorcycle body substantially orthogonal to the axial longitudinal plane of symmetry, such that pivotal centers of said opposite ends of said two arms are located at an orthogonal projection of said second and third apices with the tetrahedron, said arms each being linearly configured and defining a plane parallel to the axial longitudinal plane of symmetry of the motorcycle which contains the steering axis, wherein imaginary extensions of said arms intersect at a point which is the instantaneous center of rotation of said tetrahedron and of the stub axle with respect to the motorcycle body at any instant of time, with an imaginary axis passing through said instantaneous center of rotation and being orthogonal to the axial longitudinal plane of symmetry of the motorcycle, said motorcycle further including a crank driven by the steering control kinematic train about a crank axis and a link pivotally connected between said crank and the pivoting joint at the fourth apex of the tetrahedron, said link having a longitudinal axis passing through a point substantially located on said imaginary axis at the instantaneous center of rotation;

7. A device according to claim 6, wherein the axis of rotation of the crank is parallel to the steering axis at half load of the motorcycle.

8. A device according to claim 6, wherein the length of said crank is substantially equal to the distance from the fourth apex of the tetrahedron to the steering axis.

* * * * *